US 6,723,252 B1

(12) United States Patent
Hsiao et al.

(10) Patent No.: US 6,723,252 B1
(45) Date of Patent: Apr. 20, 2004

(54) MAGNETIC HEAD P1 MAGNETIC POLE NOTCHING WITH REDUCED POLYMER DEPOSITION

(75) Inventors: Richard Hsiao, San Jose, CA (US); John I. Kim, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 113 days.

(21) Appl. No.: 09/595,713

(22) Filed: Jun. 16, 2000

(51) Int. Cl.$^7$ ................................................ G11B 5/21
(52) U.S. Cl. ............................ 216/22; 216/37; 216/66; 216/75
(58) Field of Search ............................. 216/22, 37, 66, 216/75

(56) References Cited

U.S. PATENT DOCUMENTS

| | | | | |
|---|---|---|---|---|
| 4,592,801 A | * | 6/1986 | Hara et al. | 204/192.34 |
| 5,316,617 A | * | 5/1994 | Kawabe et al. | 216/22 |
| 5,441,596 A | | 8/1995 | Nulty | 156/643.1 |
| 5,445,712 A | | 8/1995 | Yanagida | 156/662 |
| 5,811,357 A | | 9/1998 | Armacost et al. | 438/723 |
| 5,932,492 A | | 8/1999 | Hahm et al. | 438/737 |
| 6,180,421 B1 | * | 1/2001 | Futai et al. | 216/66 |
| 6,226,149 B1 | * | 5/2001 | Dill et al. | 29/603.14 |
| 6,238,582 B1 | * | 5/2001 | Williams et al. | 216/22 |
| 6,282,776 B1 | * | 9/2001 | Otsuka et al. | 29/603.14 |

FOREIGN PATENT DOCUMENTS

JP          11053727 A       2/1999

* cited by examiner

Primary Examiner—Allan Olsen
(74) Attorney, Agent, or Firm—Robert O. Guillot; IPLO Intellectual Property Law Offices

(57) ABSTRACT

The present invention includes a two-step etching process for notching the P1 pole of the write head element of a magnetic head. In a first step, the preferred embodiment utilizes a combination of $C_2F_6$ and argon gases (designated as $C_2F_6/Ar$) as the etchant gas to preferentially etch portions of the alumna write gap layer. Thereafter, in the second step, argon is used as the etchant gas to preferentially etch the P1 pole material. The $C_2F_6/Ar$ etchant gas preferably includes $C_2F_6$ gas in a concentration range of from 50% to 90%, with a preferred concentration range being from 70% to 80%. The etching of the alumna write gap layer is preferably conducted with a first echant ion beam angle of from 5° to 30°, and a second etchant ion beam angle of from 65° to 85°.

13 Claims, 2 Drawing Sheets

MAGNETIC HEAD P1 MAGNETIC POLE NOTCHING WITH REDUCED POLYMER DEPOSITION

BACKGROUND OF THE INVENTION

1. Field of the Invention

The present invention relates generally to methods for fabricating magnetic heads, and more particularly to methods for notching the P1 magnetic pole of such magnetic heads.

2. Description of the Prior Art

One approach to increasing the areal data storage density of magnetic disks is to narrow the width of the data tracks written on the disks, such that more tracks per inch can be written, and therefore more data stored on the disk in a given area. Generally, the width of the base of the P2 magnetic pole tip determines the width of the data track; however, it is also necessary to provide some spacing between adjacent tracks, and the spacing required between data tracks is a function of the strength of the fringing magnetic fields that are created by the magnetic head. In some prior art magnetic heads, the fringing fields can be strong enough to affect data in neighboring data tracks, and the width of a fringing magnetic field can be a significant portion of a data track itself. Therefore, it is desirable to minimize the fringing fields generated by magnetic heads, such that adjacent data tracks can be written more closely together, and the areal data storage density on the disk thereby increased.

One of the fabrication methods that has been undertaken in the prior art to reduce the fringing fields is to notch the P1 magnetic pole, as is known to those skilled in the art. Such P1 pole notching can substantially reduce the fringing magnetic fields generated by the magnetic head, and can thereby increase the areal data storage density on the disk. The standard P1 notching process of the prior art utilizes the previously fabricated P2 pole tip as an etching mask element in the notching process, and the process includes first etching through the write gap layer, typically alumina ($Al_2O_3$), and then etching into the P1 pole layer (typically permalloy, a NiFe compound). A problem that initially exists in the prior art P1 notching process is that an argon ion beam was utilized to etch the P1 pole notches, and the alumina write gap layer is significantly more resistant to etching by the argon ion beam than the NiFe material of the P2 pole tip and the P1 layer. Therefore, where an argon ion beam was used in the prior art to conduct the P1 notching step, significant portions of the P2 pole tip were etched away while the beam more slowly etched through, the alumina write gap layer. Thereafter, further portions of the P2 pole tip were etched away while the P1 pole was subsequently notched by the ion beam. As a result, the earlier prior art P1 pole notching process required the initial fabrication of a rather thick P2 pole tip, such that a properly sized P2 pole tip remained following the etching in the P1 notching step utilizing an argon ion beam.

A prior art improvement in P1 notching involves the initial utilization of a first etchant gas species accelerates the etching of the alumina write gap layer and slows down the etching of the NiFe P2 pole tip material. Such a prior art etchant gas is $CHF_3$, and following the use of $CHF_3$ in the etching process to etch through the alumina write gap layer, the etchant gas was changed to argon to notch the P1 pole. As a result, a much smaller portion of the P2 pole tip was etched away during the P1 notching step than was previously the case. This prior art also teaches that a decrease of the NiFe etch rate in $CHF_3$ milling occurs due to the formation of a polymer layer on the surface of the NiFe pole.

A problem that has arisen with the use of $CHF_3$ in the etching process is that it creates excessive polymer deposition. The polymer deposition can cause product contamination and results in the need for frequent cleaning and maintenance of the tooling hardware. Such polymers are apparently created in chemical reactions associated with the ionization of the $CHF_3$ etchant gas, creating a significant problem in the utilization of $CHF_3$ for P1 notching. The present invention avoids the excessive polymer deposition problems of $CHF_3$ while maintaining the benefits of the two-step P1 pole notching process. Specifically, the present invention is a P1 notching process utilizing $C_2F_6$ as a preferred substitute for $CHF_3$.

SUMMARY OF THE INVENTION

The present invention includes a two-step etching process for notching the P1 pole of the write head element of a magnetic head. In a first step, the preferred embodiment utilizes a combination of $C_2F_6$ and argon gases (designated as $C_2F_6/Ar$) as the etchant gas to preferentially etch portions of the alumina write gap layer. Thereafter, in the second step, argon is used as the etchant gas to preferentially etch the P1 pole material. The $C_2F_6/Ar$ etchant gas preferably includes $C_2F_6$ gas in a concentration range of from 50% to 90%, with a preferred concentration range being from 70% to 80%. The etching of the alumna write gap layer is preferably conducted with a first echant ion beam angle of from 5° to 30°, and a second etchant ion beam angle of from 65° to 85°.

It is an advantage of the P1 notching process of the present invention that contamination of magnetic head during a P1 notching step is reduced.

It is another advantage of the P1 notching process of the present invention that it avoids frequent cleaning and maintenance of the tooling hardware.

It is a further advantage of the present invention that a two-step P1 notching process has been developed that rapidly etches the write gap layer in a first step and rapidly etches the P1 layer in a second step.

It is yet another advantage of the present invention that a magnetic head is reliably manufactured that has reduced fringing magnetic fields.

It is yet a further advantage of the present invention that a magnetic head has been developed having a right head element that produces reduced fringing magnetic fields, such that the areal data storage density on hard disks can be increased.

These and other features and other advantages of the present invention will no doubt become apparent to those skilled in the art on reading the following detailed description which makes reference to the several figures of the drawing.

IN THE DRAWINGS

DETAILED DESCRIPTION OF THE PREFERRED EMBODIMENTS

Figure 1:
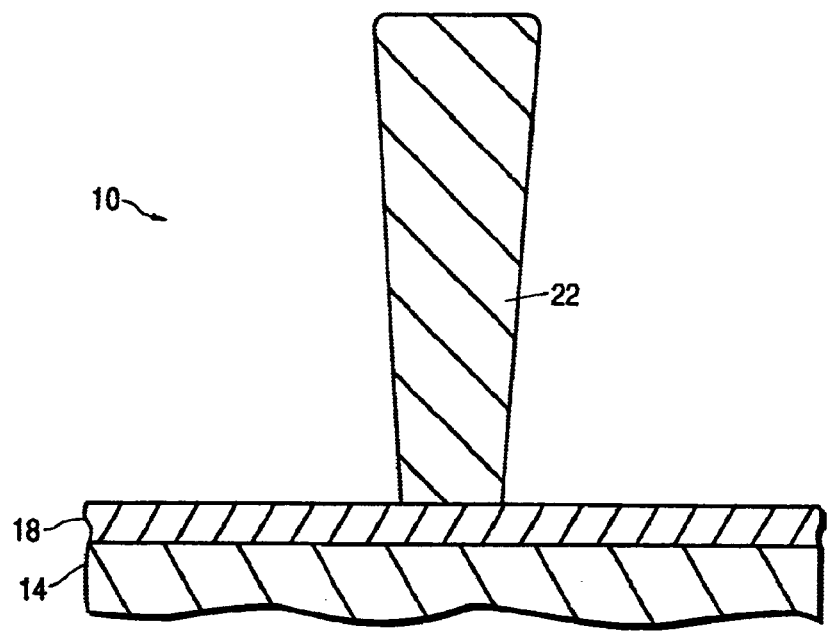
FIG. 1 is a side cross-sectional view of a fabrication step of a prior art magnetic head.

FIG. 1 is a side cross-sectional view of a prior art magnetic head taken during the fabrication of the write head elements of the head. As is well known to those skilled in the art, the magnetic head 10 includes a P1 pole 14 having a write gap layer 18 deposited thereon, and having a P2 pole tip 22 deposited onto the write gap layer. Typically, the write gap layer is comprised of alumina ($Al_2O_3$) and the P1 pole and P2 pole tip are composed of a NiFe compound such as permalloy (NiFe 80/20).

Figure 2:
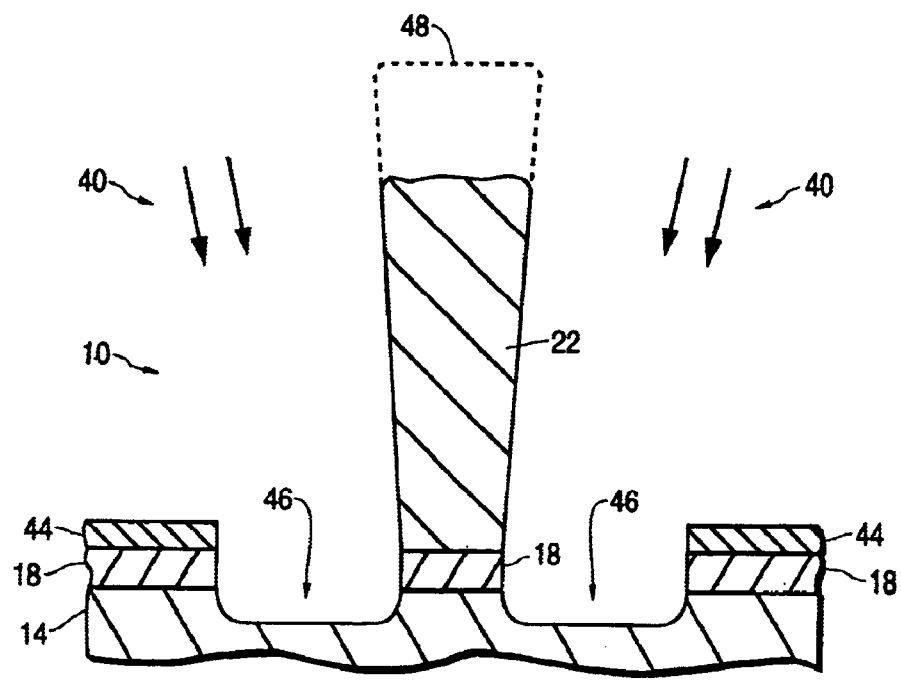
FIG. 2 is a side cross-sectional view of a prior art P1 notching step of the magnetic head a depicted in FIG. 1.

FIG. 2 is a side cross-sectional view depicting a typical prior art P1 notching step. As depicted therein, an ion beam 40 has been directed through a suitable photoresist mask 44 to etch through portions of the write gap layer 18 immediately next to the P2 pole tip 22, and to further create notches 46 within the P1 layer 14. As indicated above, an initial problem associated with the P1 notching process was that significant portions 48 of the P2 pole tip (shown in phantom) were etched away while the argon etchant gas more slowly etched through the alumina write gap layer 18 Subsequently, a two step etching process was developed wherein $CHF_3$/Ar was first utilized as an etchant gas to create etchant species that preferentially etched the alumina over the NiFe pole tip material. This prior art two-step etching process results in less etching of the P2 pole tip during the P1 notching process, however it has the undesirable problem of creating excessive organic polymer compounds that contaminate the wafer.

Figure 3:
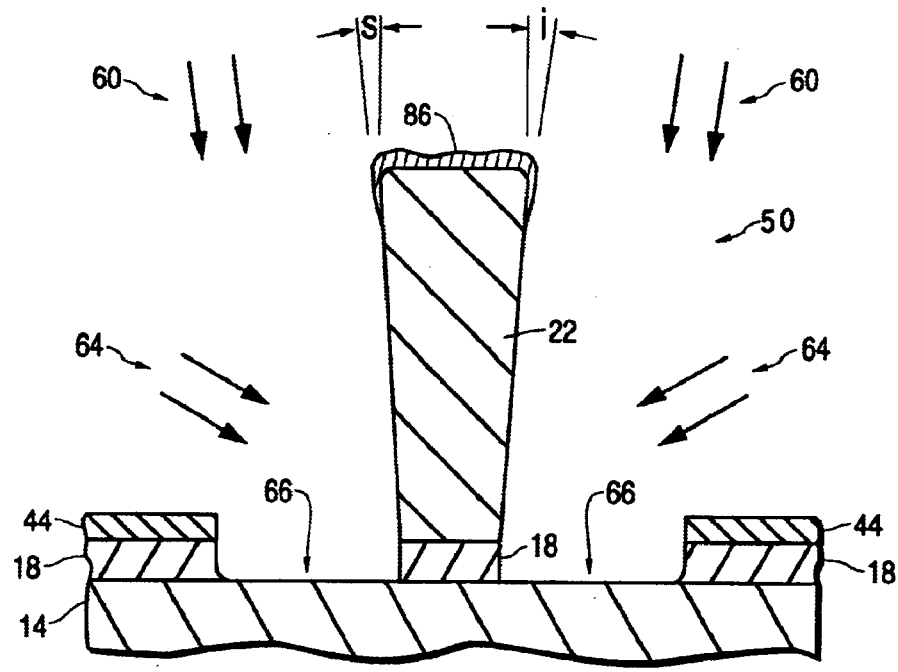
FIG. 3 is a side cross-section view of a first etching step of the P1 pole notching process of the present invention.
Figure 4:
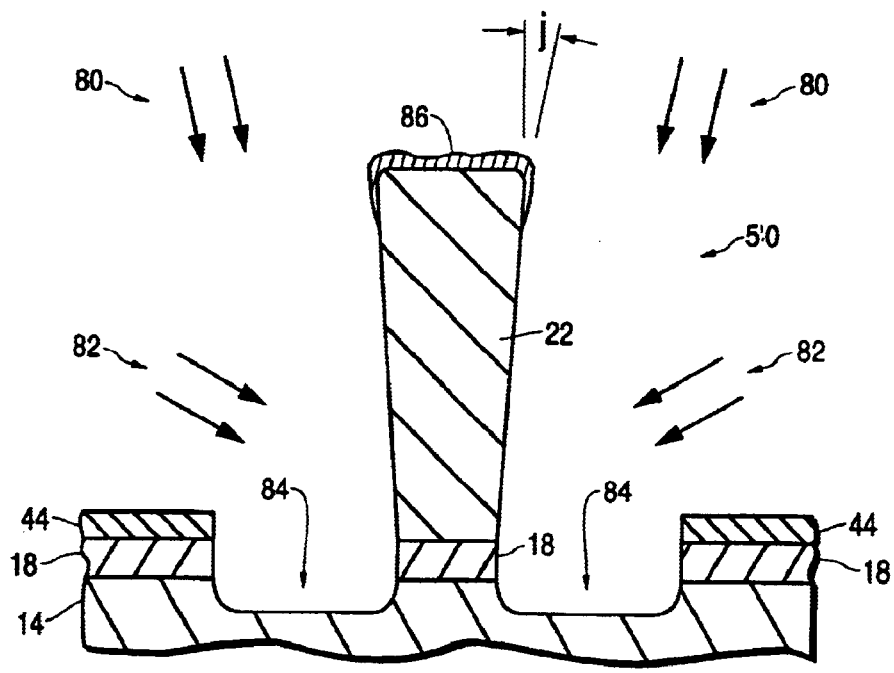
FIG. 4 is a side cross-sectional view of a second etching step of the P1 pole notching process of the present invention.

The present invention involves the use of $C_2F_6$ gas in place of the $CHF_3$ as a first etchant gas in a two-step P1 notching process. As depicted in FIG. 3, in using a combination of $C_2F_6$ and argon (designated herein as $C_2F_6$/Ar) as a first etchant gas, etchant species are created that selectively etch the alumina write gap layer preferentially over the NiFe P2 pole tip material. As described in detail hereinbelow, the ion beam of $C_2F_6$/Ar etchant gas is preferably directed at a relatively steep angle 60 and subsequently at a relatively shallow angle 64. After the alumina write gap layer has been etched using $C_2F_6$/Ar to form notches 66 through the alumina layer 18, argon gas is substituted for the $C_2F_6$/Ar in order to form etchant species that are also directed at a relatively steep angle 80 and subsequently at a relatively shallow angle 82 to form notches 84 in the P1 pole 14 as is depicted in FIG. 4.

Significantly, the use of $C_2F_6$ as an etchant gas creates fewer organic polymer contaminants than are seen with the prior art $CHF_3$ etchant gas. Thus, reduced cleaning and maintenance of tooling hardware is required. Additionally, it has been unexpectedly found that exposing NiFe to fluorine ion containing species, such as those generated in the $C_2F_6$ gas chemistry results in the formation of a beneficial Ni fluoride compound thin film layer on the surface of the P2 pole tip. Specifically, the Ni fluoride thin film 86 on the surface of the P2 pole tip apparently provides a protective layer that is more slowly etched by the argon etchant species than an unprotected NiFe P2 pole tip. This is in contrast to that which is found in the prior art $CHF_3$ etchant gas process, in which a polymer layer is formed to slow down the NiFe etching. Thus, the use of the $C_2F_6$ etchant gas also provides some protection for the P2 pole tip during the second step of the P1 layer notching with the argon etchant gas species.

As indicated above, the method for fabricating the notched P1 pole magnetic head 50 of the present invention involves two ion beam etching steps, the write gap layer etching step and the P1 pole etching step. For both steps, the ion beam voltage should be in the 600–900 volts range, with a more preferred range of 650–750 volts. The ion beam current should be in the 600–1200 mA range, with a more preferred range of 900–1100 mA.

There are two objectives in the write gap layer etching step; the first objective is to remove the write gap layer material, and the second objective is to remove any write gap layer redeposition material that is accumulated on the sidewalls of the P2 pole tip. As shown in FIG. 3, for write gap layer material removal, the incident angle i from the normal to the substrate surface of the $C_2F_6$/Ar beam is selected to be greater than the P2 pole slanting angle s, from the normal to the substrate surface. As is known to those skilled in the art, the angle s results from the P2 pole plating process conditions. Thus, where angle i is greater than angle s the shadowing of the P2 pole base by the P2 pole top is avoided. For example, if the slanting angle s is 5°, the incident angle i should be 10° or greater. In general, the angle i should be in the range of 5–30°, with a more preferred range of 10–20°. For removal of redeposition material from the sidewalls of the P2 pole tip structure, the incident angle i of the $C_2F_6$/Ar beam is chosen to be in the range of 65–80°, with a preferred range of 70–75°. Because of the good etching selectivity of $Al_2O_3$ over NiFe, this P2 pole tip sidewall cleaning step will not alter the P2 pole tip track width even if an aggressive overetch is applied.

The write gap layer etching step can be completed with one low angle (for example 15°) ion milling step to etch through the write gap layer material, followed by one high angle milling step (for example 70°) to remove the redeposition material from the P2 pole tip sidewalls. Alternatively, the low angle milling step and high angle milling step can be alternated sequentially until the write gap layer material is completely removed and the P2 pole tip sidewalls are free of redeposition material.

As indicated above, the gas mixture for the write gap layer etching step utilizes an etchant gas composed of $C_2F_6$ and Ar. The concentration of $C_2F_6$ in the gas mixture may be in the range of 50–90%, with a more preferred $C_2F_6$ concentration in range of 70–80%. In this concentration range, a stable etching condition can be maintained while a good $Al_2O_3$/NiFe etch rate ratio can be achieved. For example, at approximately 75% $C_2F_6$ and a 10° ion beam incident angle, the $Al_2O_3$/NiFe etch rate ratio is approximately 8:1.

Following the write gap layer etching step, the etchant gas is switched to Ar for the P1 pole material etching step to complete the P1 pole notching. For this P1 pole material etching step, again there are two objectives. The first objective is to remove enough P1 polematerial to produce the desired notching, and the second objective is to remove any P1 pole redeposition material that accumulates on the P2 pole tip sidewalls. Compared to $C_2F_6$, the Ar ions etch the NiFe of the P1 pole at a much faster rate. As a result, the P2 pole tip track width may be altered. during the redeposition material cleaning process. Therefore, it is desirable to minimize the amount of redeposition material produced in the P1 pole etching step, because where there is less redeposition material on the P2 pole tip sidewalls, a shorter redeposition cleaning step is needed and the likelihood of altering the P2 pole tip track width is reduced. The incident angle j (from the normal to the substrate surface) for P1 pole material removal is thus chosen to be in the 15–50° range, with a preferred range of 30–45°. For the P2 pole tip sidewall cleaning process, the incident angle j is chosen to be in the range of 65–80°, with a more preferred range of 70–75°. The P1 pole material etching step can be completed with one low angle (for example 30°) milling step to etch into the P1 pole material, followed by one high angle milling step (for example 70°). to remove the P1 pole redeposition material on the P2 pole tip sidewall. Alternatively, the low angle milling step and the high angle milling step can be alternated sequentially until a desired P1 pole notching depth is achieved and the P2 pole tip sidewall is free of redeposition material.

While the present invention has been shown and described with regard to certain preferred embodiments, it is to be understood that those skilled in the art will no doubt develop certain alterations and modifications thereto. It is therefore intended that the following claims cover all such alterations and modifications that nevertheless include the true spirit and scope of the present invention.

What is claimed is:

1. A method for fabricating a magnetic head, including the steps of:
    fabricating a P1 pole, a write gap layer and a P2 pole tip;
    notching said P1 pole using two ion beam etching steps including:
        etching portions of said write gap layer utilizing a write gap etchant ion beam that is formed from an etchant gas including $C_2F_6$ and argon, wherein said etching of said write gap layer is conducted in part with a first write gap etchant ion beam angle away from normal of from 5° to 30°, and in part with a second write gap etchant ion beam angle away from normal of from 65° to 85°;
        subsequently etching portions of said P1 pole using a P1 pole etchant ion beam that is formed using argon as an-etchant gas, wherein said etching of said P1 pole is conducted in part with a first P1 pole etchant ion beam angle away from normal of from 30° to 45°, and in part with a second P1 pole etchant ion beam angle away from normal of from 65° to 85°.

2. A method for fabricating a magnetic head as described in claim 1 wherein said $C_2F_6$/Ar etchant gas includes $C_2F_6$ gas in a concentration range of from 50% to 90%.

3. A method for fabricating a magnetic head as described in claim 2 wherein said $C_2F_6$ gas concentration range is from 70% to 80%.

4. A method for fabricating a magnetic head as described in claim 3 wherein said concentration of $C_2F_6$ in said etchant gas is approximately 75%.

5. A method for fabricating a magnetic head as described in claim 4, wherein said first write gap etchant ion beam angle is approximately 10° away from normal, and said first P1 pole etchant ion beam angle is approximately 30° away from normal.

6. A method for fabricating a magnetic head as described in claim 1 wherein said first write gap etchant ion beam angle is from 10° to 20° and said second write gap etchant ion beam angle is from 70° to 75°.

7. A method for fabricating a magnetic head as described in claim 6 wherein said first write gap etchant ion beam angle is approximately 10°.

8. A method for fabricating a magnetic head as described in claim 6 wherein said $C_2F_6$/Ar ion beam is generated with an ion beam voltage of from 600–900 volts, and an ion beam current of from 600–1200 mA.

9. A method for fabricating a magnetic head as described in claim 8 wherein said $C_2F_6$/Ar ion beam voltage is in the range of 650–750 volts and said ion beam current is in the range of 900–1100 mA.

10. A method for fabricating a magnetic head as described in claim 9 wherein a Ni fluoride thin film layer is formed on said P2 pole tip.

11. A method for fabricating a magnetic head, including the steps of:
    fabricating a P1 pole, a write gap layer and a P2 pole tip;
    notching said P1 pole in a process consisting essentially of the following two etching steps:
    etching portions of said write gap layer utilizing a write gap etchant ion beam that is formed from an etchant gas including $C_2F_6$ and argon, wherein said $C_2F_6$ gas concentration range is from 70% to 80%; and wherein said etching of said write gap layer is conducted in part with a first write gap etchant ion beam angle away from normal of from 10° to 20°, and in part with a second write gap etchant ion beam angle away from normal of from 70° to 75°;
    subsequently etching portions of said P1 pole using a P1 pole etchant ion beam that is formed from argon as an etchant gas, wherein said etching of said P1 pole is conducted in part with a first P1 pole etchant ion beam angle away from normal of from 30° to 45°, and in part with a second P1 pole etchant ion beam angle away from normal of from 65° to 80°.

12. A method for fabricating a magnetic head as described in claim 11, wherein said $C_2F_6$Ar ion beam voltage is in the range of 650–750 volts and said ion beam current is in the range of 900–1100 mA.

13. A method for fabricating a magnetic head as described in claim 12, wherein said first write gap etchant ion beam angle is approximately 10° away from normal, and said first P1 pole etchant ion beam angle is approximately 30° away from normal.

* * * * *